R-F PHASE DETECTOR

Filed June 28, 1967

INVENTORS
DAVID B. HALLOCK
RUSSELL W. HANSON

BY Marvin Moody

ATTORNEY

United States Patent Office 3,522,448
Patented Aug. 4, 1970

3,522,448

R-F PHASE DETECTOR

David B. Hallock, Marion, and Russell W. Hanson, Cedar Rapids, Iowa, assignors to Collins Radio Company, Cedar Rapids, Iowa, a corporation of Iowa Filed June 28, 1967, Ser. No. 649,589
Int. Cl. H03k 5/20
U.S. Cl. 307—233 3 Claims

ABSTRACT OF THE DISCLOSURE

A phase detector circuit utilizing a transistor operated in a frequency range above the beta cutoff causing the base current to lead the collector current by ninety degrees.

This invention relates in general to a novel phase detector circuit which utilizes a transistor operated well above the beta cutoff frequency where the base current leads the collector current by ninety degrees.

An object of this invention is to provide a phase detector including a transistor operated well above its beta cutoff frequency as an amplifier to provide a 90° phase shift between the base and collector currents.

Another object of the invention is the provision for a transistor operated well above the beta cutoff frequency in a common emitter configuration as a component in a phase detector circuit.

A feature of this invention is found in the provision for a transistor connected in a common emitter circuit and operated at a frequency range above beta cutoff so as to provide a 90° phase shift between the base and collector currents.

Further objects, features, and advantages of this invention will become apparent from the following description and claims when read in view of the accompanying drawings, in which:

Figure 1:
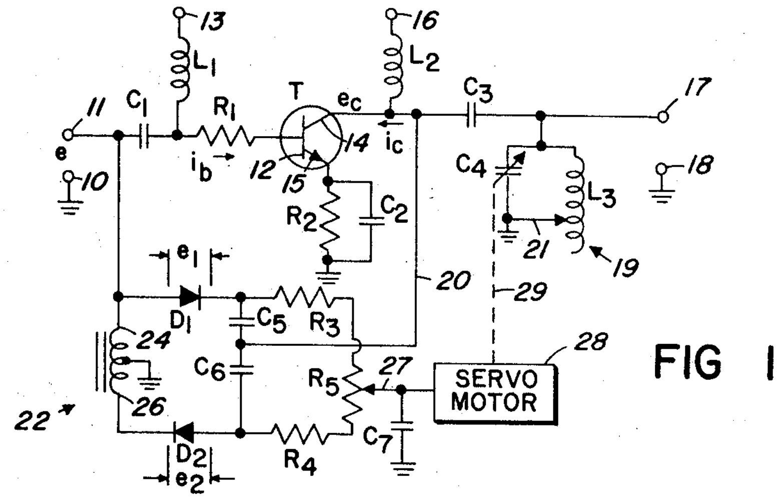
FIG. 1 is a schematic of the phase detector of this invention.

FIG. 1 illustrates a pair of input terminals 10 and 11 to which an input signal may be applied. The signal applied might be a radio frequency signal which is to be amplified and transmitted, for example. Terminal 10 is connected to ground and terminal 11 is connected to one side of a condenser $C_1$. The other side of condenser $C_1$ is connected to resistor $R_1$ which has its other side connected to the base 12 of transistor T. A base bias supply is connected to terminal 13 which is connected to an inductor $L_1$ that has its other side connected to the junction between condenser $C_1$ and resistor $R_1$. The emitter 15 of transistor T is connected to a resistor $R_2$ and a condenser $C_2$ which have their opposite sides connected to ground. The collector 14 of transistor T is connected to a condenser $C_3$ and inductor $L_2$. The other side of inductor $L_2$ is connected to a terminal 16 to which a suitable collector biasing voltage is attached. An output terminal 17 is connected to the other side of condenser $C_3$. A second output terminal 18 is connected to ground.

A tuned circuit designated generally as 19 consists of a variable condenser $C_4$ and a variable inductor $L_3$ which are connected together and to the output terminal 17. The other side of condenser $C_4$ is connected to ground and a variable slide contact 21 connects to inductor $L_3$ and is connected to ground.

A transformer 22 has its midpoint 23 connected to ground. A pair of diodes $D_1$ and $D_2$ are oppositely poled and connected to opposite ends of the transformer windings 24 and 26. Capacitors $C_5$ and $C_6$ are connected between the other sides of diodes $D_1$ and $D_2$. Input terminal 11 is connected to point 24 of transformer 22. A lead 20 connects the collector 14 to the junction point between condenser $C_5$ and $C_6$. Resistor $R_3$, $R_4$, and $R_5$ are connected in series between diodes $D_1$ and $D_2$ and an output contact 27 engages resistor $R_5$.

A condenser $C_7$ is connected between wiper contact 27 and ground and a servo motor 28 receives an input from contact 27. Servo motor 28 has an output shaft 29 which controls the tunable elements of the variable capacitor $C_4$ and the wiper contact 21 which varies the inductance of inductor $L_3$.

Figure 2:
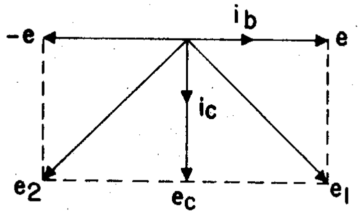
FIG. 2 is a voltage diagram.

The beta cutoff frequency is defined as the frequency at which the value of beta drops to 0.707 times its one kilocycle value. It has been discovered that by operating transistors well above the beta cutoff frequency that a 90° phase shift exists between the collector current and the base current in a common emitter configuration. This fact is utilized in the phase detector of FIG. 1. As shown in FIG. 2, when the signal applied to the input terminals 10 and 11 is at the same frequency as the resonant frequency of the tuned circuit 19, the voltage $e$ from point 24 to 23 will be $+e$ and the voltage from 23 to 26 will be $-e$. The base current $i_b$ will lead the collector current $i_c$ by 90°. The base current will be in phase with the applied voltage $e_1$. The voltage $e_1$ across diode $D_1$ will be the vector sum of the voltage $e_C$ which is the collector voltage and the applied voltage $e$ and is designated $e_1$ in diagram FIG. 2. The voltage across diode $D_2$ is $e_2$ which is the sum of negative $e$, the applied voltage, and $e_C$. As shown in FIG. 2, when the frequency of the signal applied to terminals 10 and 11 is equal to the resonant frequency of the circuit 19, the absolute magnitudes of $e_1$ and $e_2$ will be equal and the contact 27 at the midpoint of resistor $R_5$ will pick up a zero DC voltage.

Figure 3:
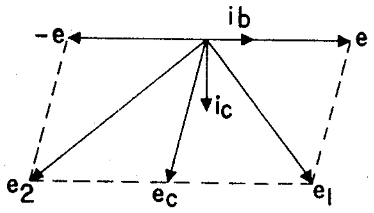
FIG. 3 is a voltage diagram.

Thus, when the circuit 19 is resonant with the input signal no output will be supplied to the servo 28. FIG. 3 illustrates a condition when the tuned circuit of $C_4$ and $L_3$ is not resonant with the input frequency. When this occurs, the collector voltage $e_C$ will not be in phase with the collector current and absolute magnitude of $e_2$ and $e_1$ will not be equal. This will cause a voltage equal to their differences to be applied to contact 27 and to servomotor 28. Servomotor 28 drives the condenser $C_4$ and contact 21 through shaft 29 until the resonant circuit is tuned to the frequency of the input signal.

Thus, the circuit of FIG. 1 allows an amplifier with its tuned circuit 19 to be tuned to the input signal applied to terminals 10 and 11.

Figure 4:
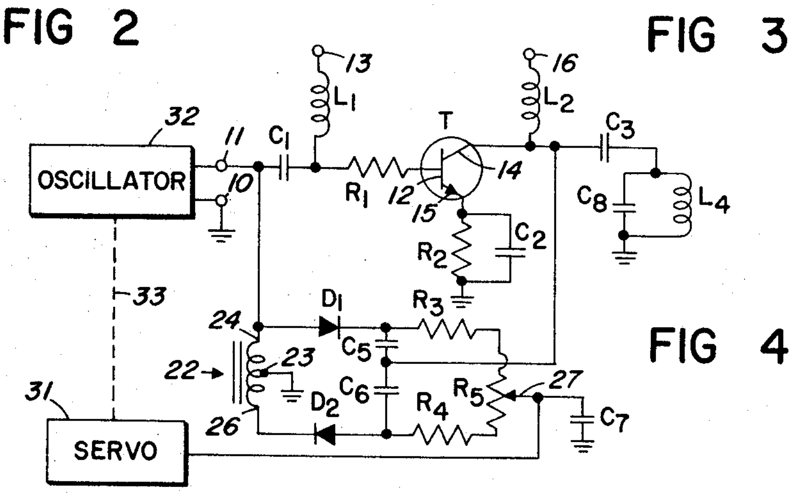
FIG. 4 is a modification of the invention.

A modification of the circuit is shown in FIG. 4 in which a tuned circuit comprising condenser $C_8$ and an inductor $L_4$ has one side connected to ground and the other side connected to the condenser $C_3$ which is connected in turn to the collector 14 of transistor T. In this embodiment, the tuned circuit 19 has been replaced by the fixed frequency circuit comprising condenser $C_8$ and inductor $L_4$ and it is desired to tune an input signal from an oscillator 32 with a servomotor 31 which has an output shaft 33 until the oscillator 32 produces an output frequency the same as the circuit comprising condenser $C_8$ and the inductor $L_4$.

The shaft 33 of the servomotor is connected to frequency changing means in the oscillator 32. Since these are the only changes in the circuit of FIG. 1, the circuit of FIG. 4 operates very similarly except that contact 27 will pick up an unbalanced signal at any time that the output of the oscillator 32 is not the same as the resonant frequency of the condenser $C_8$ and an inductor $L_4$. When this occurs, servomotor will tune the oscillator 32 through the shaft 33 until its frequency is the same as the resonant frequency of condenser $C_8$ and indicator $L_4$.

Figure 5:
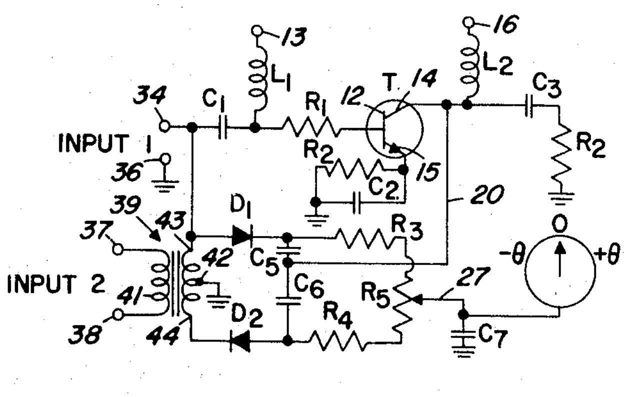
FIG. 5 illustrates a further modification of this invention.

A further modification is illustrated in FIG. 5. In this circuit input signals are applied to input terminals 34 and 36 and 37 and 38, respectively. Input terminal 36 is connected to ground and terminal 34 to the base 12 of transistor T through condenser $C_1$ and resistor $R_1$. Bias signal is supplied to terminal 13 and through $L_1$ to the junction point between condenser $C_1$ and resistor $R_1$. The emitter 15 is connected to a resistor $R_2$ and condenser $C_2$ which have their opposite sides connected to ground. The collector 14 is connected to a condenser $C_3$ and to a resistor $R_7$ which has its opposite sides connected to ground. A collector biasing terminal 16 is connected through an inductance $L_2$ to the collector 14.

A transformer 39 has its primary 41 connected to input terminals 37 and 38. The midpoint 42 of the secondary of the transformer is connected to ground. One end 43 of the secondary 42 is connected to a diode $D_1$ and the other end 44 is connected to diode $D_2$. Condensers $C_5$ and $C_6$ are connected between the other sides of diodes $D_1$ and $D_2$. A lead 20 connects collector 14 of transistor T to the junction point between condensers $C_5$ and $C_6$. Resistors $R_3$, $R_4$ and $R_5$ are in series between condensers $C_5$ and $C_6$. Contact 27 is connected to the midpoint of resistor $R_5$. Condenser $C_7$ is connected between contact 27 and ground and a phase meter 46 is connected to the contact 27.

In operation, if the signals applied to terminals 34 and 36 and 37 and 38 are in phase, the meter 46 will read zero phase difference. If the signals are not in phase, the meter will read the amount of phase lag or lead between input signals.

In a particular circuit an amplifier according to FIG. 1 was constructed which operated at 97.5–185 mHz. In this range the transistor T was operating with a beta angle of ninety degrees.

It is seen that this invention provides a new and novel phase detector in which the collector of the transistor is operated well beyond the beta cutoff frequency. Under such conditions the collector current lags the base current by 90°. This characteristic is used in the phase detector.

Although this invention has been described with respect to particular embodiments thereof, it is not to be so limited as changes and modifications may be made therein which are within the spirit and scope of the invention as defined by the appended claims.

We claim:

1. A phase detector comprising a transistor operated above beta cutoff so that the collector current lags the base current by ninety degrees, first input signal means connected to the base of the transistor, a second signal means connected to the collector of the transistor, and amplitude comparing means connected to the base and collector to produce a signal which is zero if the first and second signals are at the same phase and to produce an output signal if they are not at the same phase.

2. In apparatus according to claim 1, means receiving the output signal and connected to adjust one of the input signals so that the two input signals are at the same phase.

3. A phase detector comprising a transistor operated above its beta cutoff frequency so that the collector current lags the base current by ninety degrees, an input signal means coupled to the base of the transistor, a tunable circuit coupled to the collector of the transistor, and voltage comparing means receiving inputs from the input signal and the tunable circuit to product a signal which is zero when the tunable circuit is tuned to the input signal and to produce an output signal when the tunable circuit is not resonant at the input signal.

References Cited

UNITED STATES PATENTS

| | | | |
|---|---|---|---|
| 1,620,204 | 3/1927 | Heising | 331—34 X |
| 2,467,335 | 4/1949 | Rath | 318—18 |
| 2,469,744 | 5/1949 | Razek | 318—18 |
| 2,653,243 | 9/1953 | McClellan | 318—18 X |
| 2,886,752 | 5/1959 | De Long | 307—295 |

DONALD D. FORRER, Primary Examiner

R. C. WOODBRIDGE, Assistant Examiner

U.S. Cl. X.R.

307—295; 318—18; 331—34